United States Patent
Jones et al.

(10) Patent No.: US 8,740,426 B2
(45) Date of Patent: Jun. 3, 2014

(54) APPARATUS AND METHOD FOR VEHICLE DISPLAY LIGHTING

(75) Inventors: Thomas L. Jones, Clover, SC (US); Dirk Dudenbostel, Madison, AL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 190 days.

(21) Appl. No.: 12/962,428

(22) Filed: Dec. 7, 2010

(65) Prior Publication Data

US 2012/0140499 A1     Jun. 7, 2012

(51) Int. Cl.
*B60Q 1/00* (2006.01)

(52) U.S. Cl.
USPC ....... 362/489; 362/23.16; 362/97.4; 362/295; 362/394; 362/632; 345/102; 345/55; 345/60; 345/76; 345/82; 345/204; 345/690; 345/156; 345/173; 361/679.01

(58) Field of Classification Search
USPC ............... 362/23, 28, 29, 30, 632, 633, 97.2, 362/97.4, 295, 394; 345/102, 55, 60, 76, 345/82, 87, 204, 690, 156, 173; 361/679.01
See application file for complete search history.

(56) References Cited

U.S. PATENT DOCUMENTS

| | | | | |
|---|---|---|---|---|
| 6,055,029 | A * | 4/2000 | Kurihara et al. | 349/65 |
| 7,048,397 | B2 * | 5/2006 | Birman | 362/26 |
| 7,252,400 | B2 * | 8/2007 | Clugston et al. | 362/26 |
| 7,382,237 | B2 * | 6/2008 | Stoschek et al. | 340/438 |
| 7,571,696 | B1 * | 8/2009 | Fong et al. | 116/286 |
| 7,656,393 | B2 * | 2/2010 | King et al. | 345/173 |
| 2010/0214097 | A1 * | 8/2010 | Bowden et al. | 340/540 |
| 2011/0018849 | A1 * | 1/2011 | Lowe et al. | 345/205 |

* cited by examiner

*Primary Examiner* — Thomas Sember
*Assistant Examiner* — Tsion Tumebo

(57) ABSTRACT

A display includes a display surface and a bezel. The bezel includes a top surface and a bottom surface. The bezel and bottom surface of the bezel covers a first area of display surface around the perimeter of the display, thereby leaving a second area of the display surface, inside the bezel, uncovered. At least one graphical indicator is disposed at or in the bezel. The display is configured and arranged to produce and emit light from one or more selected portions of the first area of the display surface, which are below the bottom surface of the bezel such that the emitted light passes through the bezel and is effective to illuminate the graphical indicator.

18 Claims, 4 Drawing Sheets

APPARATUS AND METHOD FOR VEHICLE DISPLAY LIGHTING

FIELD OF THE INVENTION

The field of the invention relates to lighting of displays and more specifically to lighting of graphical indicators associated with displays.

BACKGROUND

Various types of vehicles are used in society today. The vehicles typically have different types of equipment that the users of these vehicles utilize to perform various tasks. For instance, various displays are used to present different types of information to users of the vehicle. Graphical indicators (e.g., alphanumeric information or icons to mention two examples) are sometimes displayed on the screens and at other times placed on a surrounding structure to aid users in interpreting information displayed on the screen. Graphical indicators may include vehicle speed information (e.g., speed markers), navigation information (e.g., directional markers), or vehicle radio information (e.g., radio frequencies) to mention a few examples. In one specific approach, a visible area of a display screen may present a map to a user while graphical indicators on the screen or surrounding structure show directions (north, south, east, or west).

To illuminate the graphical indicators, dedicated light sources (e.g., light emitting diodes) separate from the displays have been used. In these arrangements, light must somehow be delivered from the light source to the graphics. This requires that the light source be located near the intended target graphic (i.e., to shine directly on the target graphic) or some kind of light piping apparatus is used to transport the required illumination from the light source to the intended target graphic.

Unfortunately, the above-mentioned systems are expensive and/or difficult to assemble given the light sources selected, the discrete level of illumination needed, and the chosen illumination delivery approach. For instance, light piping approaches do not lend themselves to illuminating individual graphics and are typically not practicable for illuminating an individual graphic in varying colors. If illuminating the graphic in different colors is desired and a dedicated light source is used for each graphic, then multiple light sources bunched together are required in previous approaches.

Figure 1:
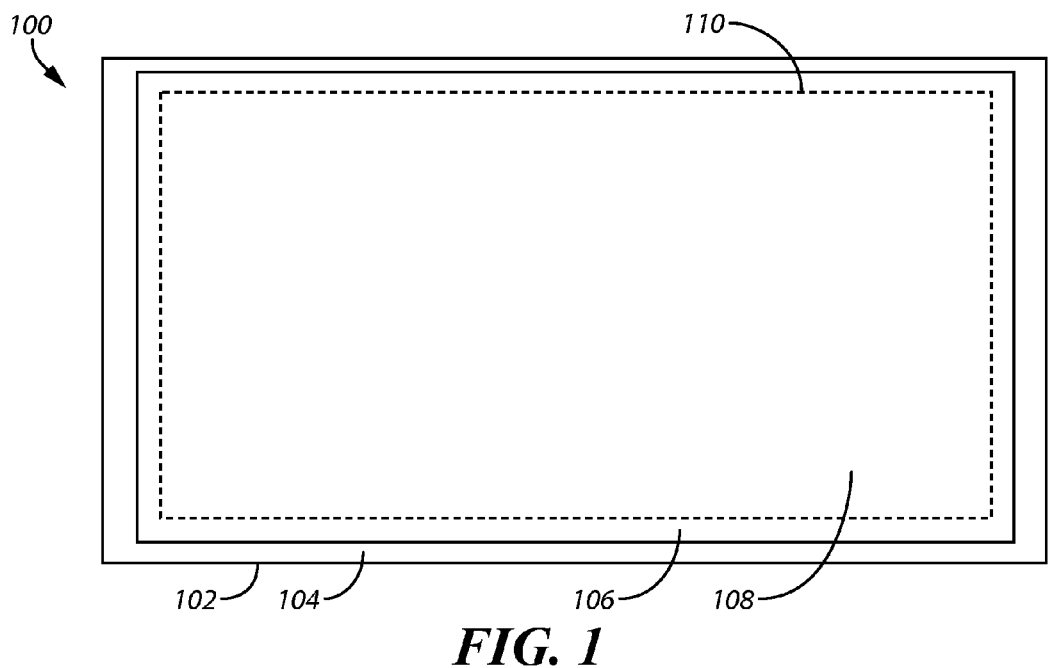
FIG. 1 comprises a diagram of a display layout according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided that illuminate graphical indicators associated with displays, for example, in vehicles. In the approaches described herein, the size, color, location, or some other parameter of the light source used to illuminate a graphical indicator at a bezel is changed and customized through the configuration and control of a display and the light-producing elements (e.g., pixels) of the display. Advantageously, by utilizing the present approaches the need for dedicated circuitry to provide an illumination function (such as light pipes) is eliminated. The desired graphics or symbols may be illuminated precisely and selectively. In some approaches (e.g., non-monochrome displays), individual graphics are illuminated in a different colors or intensities (or some other parameter) than those neighboring symbols and/or graphics. As a result, the present approaches provide great flexibility in illuminating the graphical indicators presented at a bezel.

In some of these embodiments, a display is provided that includes a display surface and a bezel. As used herein, "display" is any display presentation device (e.g., a CRT display, a touch screen display, a liquid crystal display to mention a few examples) that presents any type of information (graphical, character, video, numerical and so forth) to users through light producing elements (e.g., pixels) that comprise the display. As used herein the display may be a single controlled device (i.e., with one contiguous screen, or be comprised of multiple screens that are integrated together). As used herein, "bezel" means a rim or band of material that projects from and surrounds a perimeter of the display. A bezel may serve to secure the display to portions of the vehicle or provide other mechanical functions. As mentioned, the bezels herein have attached thereto graphical indicators or information (e.g., alphanumeric or icons) that present vehicle information (e.g., vehicle speed gauge information (speed markers), directional information (north, south, east or west), radio station information, and so forth) to users.

It will also be appreciated that while the approaches described herein relate to presenting information to users of vehicles (e.g., cars, trucks, planes, trains, to mention a few examples), these approaches can be applied to presenting information in a variety of different environments. For example, the approaches described herein can be implemented in display devices not only in vehicles, but in homes, schools, offices, and so forth.

In one aspect, the bezel includes a top surface and a bottom surface and the bottom surface of the bezel covers a first area of display surface leaving a second area of the display surface uncovered. At least one graphical indicator is disposed at the bezel. The display is configured and arranged to produce and emit light from one or more selected portions of the first area of the display surface such that the emitted light passes through the bezel and is effective to illuminate the at least one of the graphical indicators.

In others of these embodiments, one or more selected portions of the first area are configured to be varied in size. In some aspects, the one or more selected portions are selectively movable within the first area. In other aspects, the one or more selected portions have an adjustable brightness. In other examples, the one or more selected portions have an adjustable color.

In some aspects, the bezel is constructed of a clear material. The clear material may be a polycarbonate or an acrylic material. Other examples of materials can be used to construct the bezel.

In some examples, a graphical indicator is disposed on the top surface of the bezel so as to be directly above the bottom surface of the bezel. In this configuration, light is transmitted more-or-less directly through the bezel to illuminate the graphic. In other examples, the graphical indicator is disposed on the top surface of the bezel so as to not directly above the bottom surface of the bezel. In these later configurations, the light may be transmitted in an indirect path to the graphic indicator (e.g., it may be reflected internally in the bezel and be transmitted along an indirect or non-straight path to the graphical indicator).

In some examples, the display includes a paint substance (e.g., an ink) for the graphical indicator. In some approaches, the ink is disposed on at least one of portions of the top surface of the bezel and portions of the bottom surface of the bezel. Other locations can also be used for the ink.

In others of these embodiments, the identity of at least one area of a display to illuminate is determined. At least one area of the screen is actuated to produce light rays, and the at least one area is at least partially covered by a bezel. The light rays are conducted through the bezel to illuminate the graphical indicator.

In some examples, the size of the area of the light source is varied over time. In other aspects, the area is moved over time such that one area illuminates at a first time and another area illuminates at a second time. In still other examples, the brightness or the color of the area is varied over time.

In still others of these embodiments, a bezel includes a solid body portion and a graphical indicator. The solid body portion is constructed from a light conducting material and has an upper surface and a lower surface. The graphical indicator is disposed on the upper surface. The lower surface of the bezel is disposed so as to completely cover a light source and the light source is selectively actuated to produce light that traverses the bezel and illuminates the graphic indicator.

In some examples, the clear material may be a polycarbonate or an acrylic. Other examples of materials are possible. In other aspects, the bezel further includes an ink. The ink is disposed on portions of the upper surface of the bezel or portions of the lower surface of the bezel to mention two examples. Other locations may also be used.

In others of these embodiments, an instrument panel in a vehicle includes one or more displays and one or more bezels. The display has a display surface that displays at least one indicator related to vehicular operation. The bezel has a top surface and a bottom surface and the bottom surface of the bezel covers a first area of display surface leaving a second area of the display surface uncovered. At least one graphical indicator disposed at the bezel. The display is configured and arranged to produce and emit light from one or more selected portions of the first area of the display surface such that the emitted light passes through the bezel and is effective to illuminate the at least one graphical indicator. The instrument panel may display any instrument related to vehicular operation (or components or elements of the vehicle) such as radios, air conditioning units, heating units, video and audio units, mapping units, to mention a few examples. Other examples are possible.

Referring now to FIG. 1, one example of a display layout is described. A display 100 includes a display perimeter 102, a display inactive area 104, a display visible area 108, and a display visible area line 110. The display 100 may utilize any type of technology and, in this respect, may be a touch screen, CRT screen, liquid crystal display, or any other type of display device that can present information to a user. In one aspect, the screen is constructed of individual pixels and these pixels are activated to display information to a user. In one example, the display 100 is a monochromatic display that presents map information to a user.

The display perimeter 102 is the perimeter or outermost extension of the display 100. The display inactive area 104 is the area on the display where no graphics are displayed or can be displayed. A lighting source area 106 allows for bezel illumination. Display light diffusers may be removed from the area 106.

The display visible area 108 is the visible area of the display to the user. The display visible area line 110 is a line that defines the boundaries of the display visible area 108.

Figure 2:
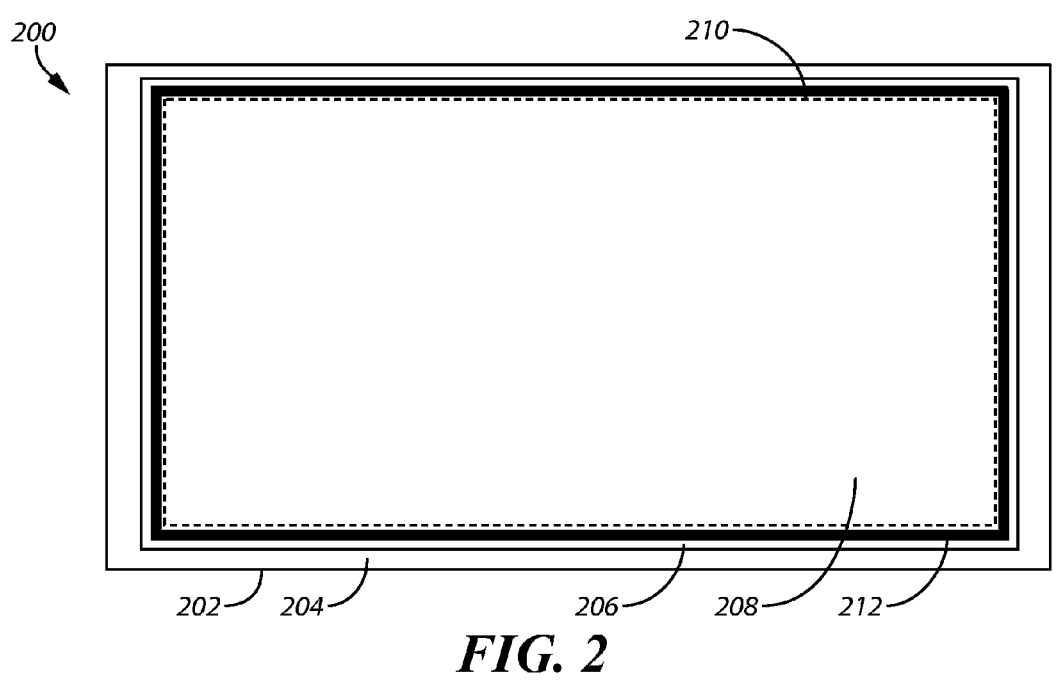
FIG. 2 comprises a diagram of another display layout according to various embodiments of the present invention.

Referring now to FIG. 2, another example of a display layout is described. A display 200 includes a display perimeter 202, a display inactive area 204, a bezel illumination area 206, a display visible area 208, a display visible area line 210, and a separation area 212. The display layout of FIG. 2 is similar to the display layout of FIG. 1 except that the separation area 212 is disposed between the visible area 210 and the bezel illumination area 206. The pixels for the display are not activated in this area. In one example, the display 200 is a multi-color display.

Figure 3:
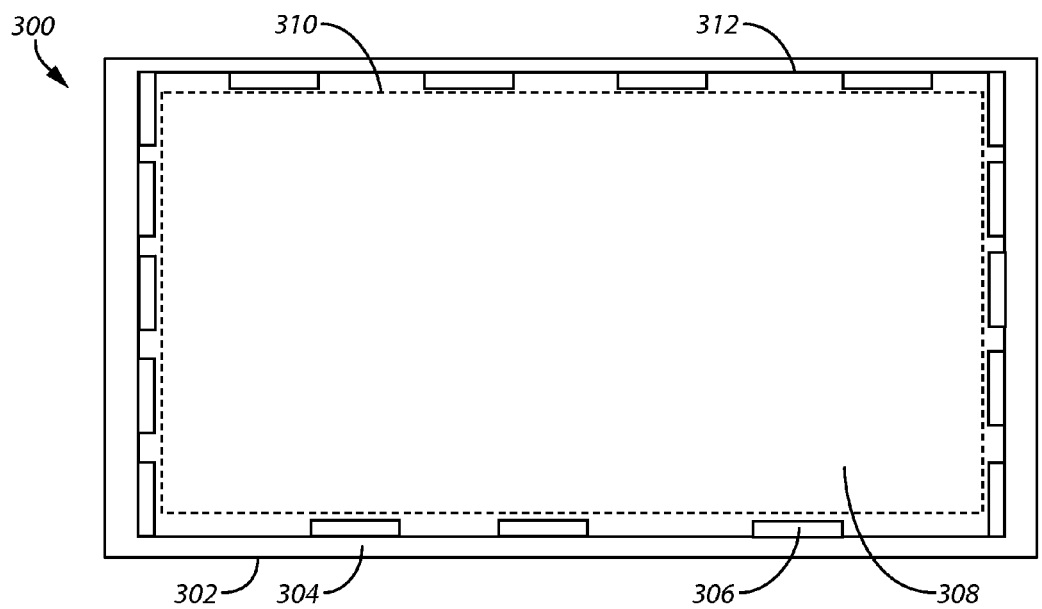
FIG. 3 comprises a diagram of still another display layout according to various embodiments of the present invention.

Referring now to FIG. 3, another example of a display layout is described. A display 300 includes a display perimeter 302, a display inactive area 304, an area for icon or graphics dedicated bezel illumination 306, a display visible area 308, a display visible area line 310, and a separation area 312. In one example, the screen 300 provides multicolor displays with different colored icons or graphics.

The separation area 312 is disposed between the visible area 308 and the bezel illumination area 306. The separation area 312 may be of any color or the pixels of the screen may not be activated in this area. The bezel illumination area 306 may have the display diffusers removed from specific areas or may be removed from the entirety of the area 306 for easier reconfiguration.

Figure 4:
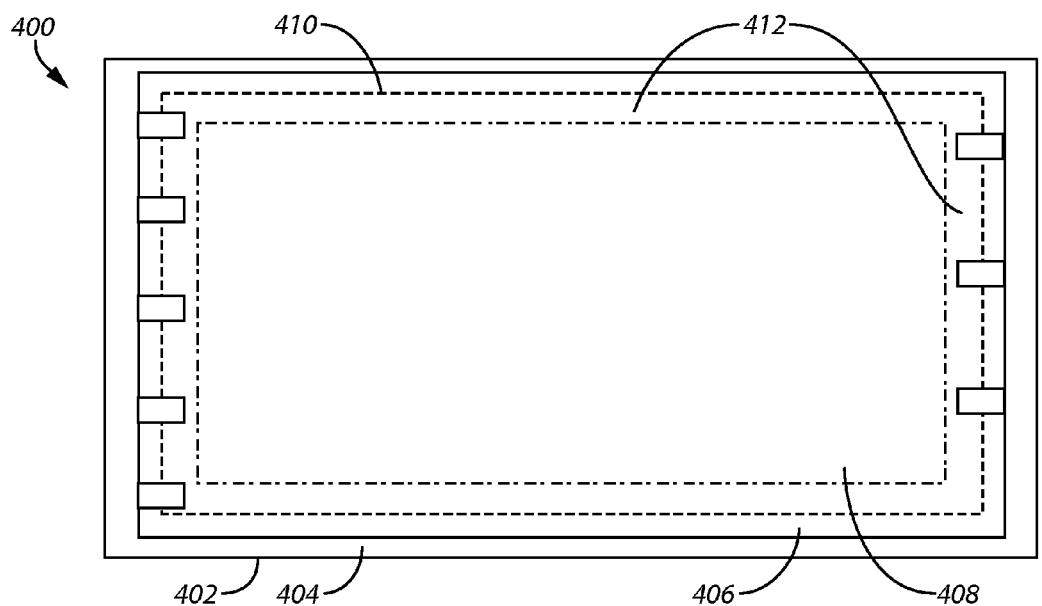
FIG. 4 comprises a diagram of yet another display layout according to various embodiments of the present invention.

Referring now to FIG. 4, another example of a display layout is described. A display 400 includes a display perimeter 402, a display inactive area 404, an area for icon or graphic dedicated bezel illumination 406, a reduced area for illumination 408, an original display visible area line 410, and a new display visible area line 412. In one example, the display 400 provides color displays with different colored icons or graphics.

The area 408 is reduced in size as compared to the examples of FIGS. 1-3. In this respect, original line 410 is now moved to new line 412. Areas 406 are provided for icon or graphic illumination. For example, the areas 406 are useful when a non-uniform bezel illumination area with separate and contained spaces for different graphics is desired so as to avoid light bleed between various target icons or graphics, Referring now to FIG. 5, an example of a bezel and display system is described. The system includes a bezel 502, a lighting source area 504, and a display 500. The lighting source area 504 may be a pixel or group of pixels on the display 500 that are controlled to emit light. The lighting source area 504 provides light that illuminates a target graphic 510 on the bezel 502.

The bezel 502 includes a top surface 522 and a bottom surface 523 and the bottom surface 523 of the bezel 502 covers a first area 530 of the display 500 leaving a second area 531 of the display 500 uncovered. In this example, the bezel completely covers the light source but it will be appreciated that in some examples the bezel may only partially cover the light source area. As mentioned, one or more graphical indicators 510 are disposed at the bezel 502. The indicators 510 may be ink, or some other material. The display 500 is configured and arranged to produce and emit light from one or more selected portions of the lighting source area 504 such that the emitted light passes through the bezel 502 and is effective to illuminate the graphical indicator 510.

As mentioned above, one or more selected portions of the first area 530 may be configured to vary in size. For instance, different pixels (forming different shapes) on the display can be illuminated at different times. The dimensions of these shapes may also be changed over time. In some other aspects, the one or more selected portions are selectively movable within the first area. For example, different pixel groupings may be illuminated at different times such that different areas of the bezel are illuminated at different times. In other aspects, the one or more selected portions have an adjustable brightness. For instance, the brightness of the pixels can be varied. In some other examples, the one or more selected portions have an adjustable color. For example, different pixels may be configured to emit different colored light.

In some aspects, the bezel 502 is constructed of a clear material. The clear material may be a polycarbonate or an acrylic. Other examples of materials are possible.

In some examples, the graphic indicator may include a paint substance (e.g., an ink or some type of paint). In some approaches, the painting substance is disposed on at least one of portions of the top surface 522 of the bezel 502 and portions of the bottom surface 523 of the bezel 502. Other locations can also be used for the graphical indicator 510.

In others of these embodiments, the identity of at least one area of a display to illuminate is determined, for example, by a microprocessor or controller coupled to or associated with the display 500. At least one area to produce light rays is actuated on the display 500, and the at least one area is at least partially covered by the bezel 502. The light rays are conducted through the bezel 502 to illuminate the graphical indicator.

In still others of these embodiments, the bezel 502 includes a solid body portion and a graphical indicator. The solid body portion is constructed from a light conducting material and has an upper surface 522 and a lower surface 523. The graphical indicator is disposed on the upper surface 522. The lower surface 523 of the bezel 502 is disposed so as to completely cover a light source 504 and the light source 504 is selectively actuated to produce light that traverses the bezel and illuminates the graphic indicator 510.

Figure 6:
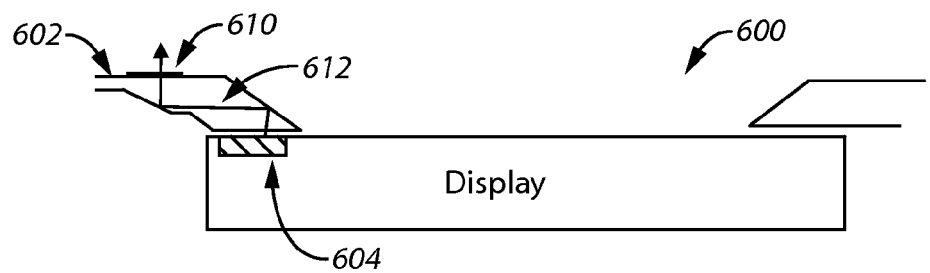
FIG. 6 comprises a cross-sectional diagram of another example of a bezel that includes graphic indicators used with a display according to various embodiments of the present invention.

Referring now to FIG. 6, another example of a bezel and display system is described. The system includes a bezel 602, a source area 604, and a display 600. The source area 604 may be a pixel or group of pixels on the display 600. The source area 604 provides light that illuminates a target graphic 610 on the bezel 602. The bezel 602 may be constructed from a clear light conducting material such as polycarbonates or acrylics to mention two examples. The bezel is configured to provide a light path 612 that reflects internally in the bezel 602 to reach the target graphic.

Figure 7:
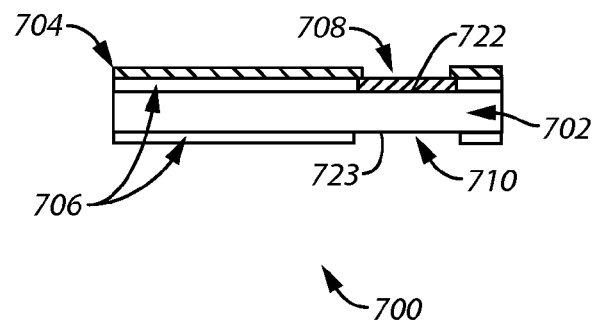
FIG. 7 comprises a cross-sectional diagram of a bezel according to various embodiments of the present invention.

Referring now to FIG. 7, one example of a bezel 700 is described. The bezel 700 includes a bezel core material, which may be a clear, light conducting material such as a polycarbonate or an acrylic to mention two examples.

Figure 5:
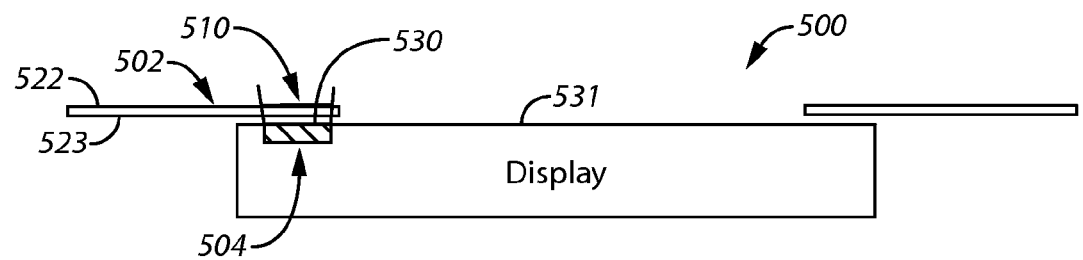
FIG. 5 comprises a cross-sectional diagram of a bezel that includes graphical indicators used with a display according to various embodiments of the present invention.

Opaque ink 704 covers the core 702 as shown and may be reflective if needed. Another ink layer or coating 706 is provided as shown. A translucent neutral display area 708 is provided above the core 702. This may be tinted ink that defines the graphic. A light aperture 710 (for a flat bezel as shown in FIG. 5) or a facet face (for a contoured bezel as shown in FIG. 6) is provided to allow light from a light source to be transmitted through the bezel to illuminate the graphic. The bezel 700 can be configured as a flat bezel (FIG. 5) or a contoured bezel (FIG. 6).

The bezel 700 includes a solid body portion (core) 702 and a graphical indicator in the display area 708. The solid body portion 702 is constructed from a light conducting material and has an upper surface 722 and a lower surface 723. The graphical indicator is disposed on the upper surface 722. The lower surface of the bezel 700 is disposed so as to completely (or in some examples partially) cover a light source and the light source is selectively actuated to produce light that traverses the bezel and illuminates the graphic indicator.

Figure 8:
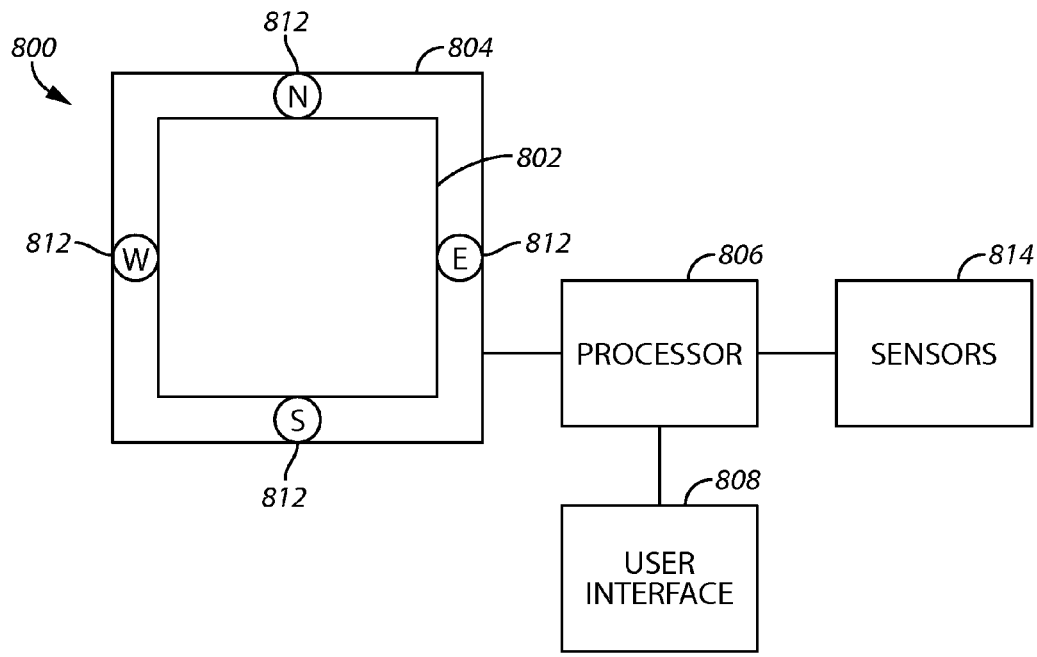
FIG. 8 comprises a block diagram of a system for displaying information in a vehicle according to various embodiments of the present invention.

Referring now to FIG. 8, one example of a system for displaying information in a vehicle is described. The system 800 includes a display screen 802, a bezel 804, and a microprocessor 806. A user interface 808 (e.g., buttons or switches) is coupled to the microprocessor 806 and allows a user to select a display function (e.g., display a GPS mapping function). Sensors 814 are coupled to the microprocessor 806 and may sense any type of information or conditions (e.g., lighting conditions) used in screen illumination decisions. The screen 802 is configured according to any of the arrangements described herein (e.g., according to the configurations of FIGS. 1-4). The bezel 804 includes graphic indicators 812 and may be configured according to any of the approaches described herein (e.g., according to any of the approaches described with respect to FIGS. 5-7).

The microprocessor 806 is any programming device that is configured to control the display screen 802. In this respect, it controls illumination of areas beneath the bezel 804 that illuminate the indicators 812. The microprocessor 806 allows other information to be displayed on a visible portion of the screen 802. For example, map information may be displayed at a visible area of the screen 802 to a user. It will be appreciated that the microprocessor 806 may include a memory on which is stored computer code that can be used to execute any of the approaches described herein to illuminate the display and thereby illuminate the graphical indicators on the bezel 804.

Figure 9:
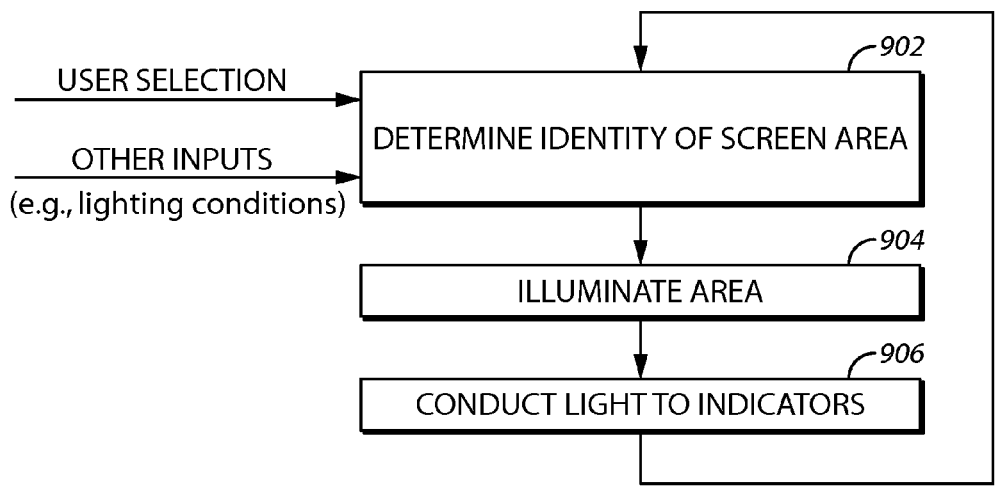
FIG. 9 comprises a flow chart of one approach for displaying information in a vehicle according to various embodiments of the present invention.

Referring now to FIG. 9, one example of an approach for displaying information in a vehicle is described. At step 902, the identity of at least one area of a display to illuminate is determined. For example, the same area of the screen may be illuminated at all times to illuminate the graphical indicator on the bezel. In other aspects, different areas of the screen may be illuminated at different times. In this respect, the size of the illuminated area may vary over time. In still other aspects information may be received regarding the available lighting conditions (i.e., the darkness level) to determine of illumination is needed. For example, the user may select a mapping function that causes predetermined graphics to be illuminated.

Moreover, the individual elements of the display that are actuated may be actuated to provide different forms of lighting depending upon the graphical indicator to be illuminated. For example, the display may generate light in a first color and intensity to illuminate a first graphical indicator and produce light of a different color and intensity of a second graphical indicator all at the same time. Thus, the screen can be controlled to selectively illuminate different graphical indicators at different times and vary how these indicators are illuminated (e.g., by varying colors or light intensities to mention a few examples). This provides great flexibility in illuminating the graphical indicators. This also allows changes as to the lighting patterns to be used to be easily made since the controller controlling the screen can easily be re-programmed or its programming quickly updated.

Once the area of the display to be illuminated has been determined at step 902, then at step 904 the determined area of the display is actuated (illuminated) to produce light rays and this area is at least partially covered by a bezel. At step 906, the light rays are conducted through the bezel to illuminate the graphical indicator on the bezel. Control then returns to step 902 to determine the next area to be illuminated. For instance, all an installer or manufacturer need do is to re-program the controller to change the light patterns illuminated by the screen.

Thus in the approaches described herein, the size, color, location, or some other parameter of the light source is changed and customized through the configuration of the display layout. Additionally, the need for dedicated circuitry that is needed to provide an illumination function (such as light pipes) is eliminated. In some approaches (e.g., non-monochrome displays), individual graphics and displays are illuminated in a different color than those neighboring symbols and/or graphics.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A display system comprising:
   a display presentation device comprising a plurality of individual light producing pixels capable of being selectively activated to display information, the presentation device having a substantially planar top surface having a perimeter, a display inactive area inside the perimeter, a first lighting source area inside the display inactive area comprising a first plurality of light-producing pixels and configured to provide illumination for a bezel and, a display visible area inside the first lighting source area, the display visible area comprising a second plurality of light-producing pixels;
   the bezel having a top surface, a bottom surface, and a substantially clear, light path portion extending between the top surface and bottom surface, the bottom surface of the bezel covering at least part of the first lighting source area and leaving the display visible area uncovered, the substantially planar top surface of the bezel being located above and substantially parallel to the substantially planar top surface of the display presentation device, a first portion of the bezel top surface being outside the perimeter;
   a graphical indicator disposed on the top surface of the bezel, the graphical indicator being located on the bezel top surface such that at least part of the graphical indicator is located outside the perimeter;
   wherein the display presentation device is configured and arranged to selectively emit light from one or more selected portions of the first lighting source area such that light emitted from the one or more selected portions and traveling in a first direction, enters the bottom surface of the bezel, travels in a different second direction through the light path portion and exits the bezel top surface traveling in said first direction, such that light from the first lighting source area passes through the bezel, to illuminate the graphical indicator outside the perimeter.

2. The display of claim 1 wherein one or more selected portions of the first lighting source area are configured to be varied in size.

3. The display of claim 1 wherein the first and second directions are substantially orthogonal to each other, and wherein the second direction is substantially parallel to the top surface of the display presentation device.

4. The display of claim 1 wherein the light emitted from the first plurality of light-producing pixels has an adjustable brightness.

5. The display of claim 1 wherein the light emitted from the first plurality of light-producing pixels has an adjustable color.

6. The display of claim 1 wherein the bezel is constructed of an optically clear material.

7. The display of claim 6 wherein the clear material is selected from the group consisting of a polycarbonate and an acrylic.

8. The display of claim 1 further comprising a paint substance, the paint substance disposed on portions of at least one of: the top surface of the bezel and the bottom surface of the bezel.

9. The display of claim 8 wherein the paint substance comprises an ink.

10. A method of illuminating a graphic indicator on a bezel, the method comprising:
    determining a first portion of a first lighting source area of a display presentation device to illuminate, by selectively activating a first light source in the first portion of the first lighting source area, the presentation device having a perimeter, a display inactive area inside the perimeter, the first lighting source area being located inside the display inactive area, the display presentation device also having a second display area located inside the first lighting source area;
    actuating the first light source in the first portion of the first lighting source area to produce light rays, the first lighting source area being at least partially covered by a light transmissive bezel, the bezel having a top surface, a substantially planar bottom surface, and a substantially clear, light path portion extending between the top surface and bottom surfaces, the bezel bottom surface covering at least part of the first lighting source area, the bezel additionally being internally reflective and additionally configured to have a graphical indicator located on the top surface of the bezel such that at least part of the graphical indicator is located outside the perimeter wherein light from the light source is conducted through the bezel bottom surface in a first direction, conducted in a second direction through the light path portion and exits the top surface of the bezel in said first direction, providing illumination to portions of the graphical indicator outside the perimeter.

11. The method of claim 10 further comprising, varying the size of the first portion of the first lighting source area.

12. The method of claim 10 further comprising moving the location of the first portion of the first lighting source area.

13. The method of claim 10 further comprising: varying a brightness of light emitted from the first portion of the first lighting source area.

14. The method of claim 10 further comprising: varying a color of the first portion of the first lighting source area.

15. A bezel comprising:
a solid, light-path portion constructed from a light conducting material which also reflects light internally, the light-path portion extending between an upper surface of the light-path portion and a lower surface of the light-path portion;
the lower surface of the bezel disposed so as to substantially cover a light source located inside a first lighting source area of a display presentation device having, which is located inside a display inactive area of the display presentation device, which is located inside a perimeter of the display presentation device, the light source being selectively actuated to produce light that traverses the lower surface of the bezel traveling in a first direction, the light-path portion of the bezel being configured to change the direction of said light from the first direction to a second direction, pass light through the light-path portion in said second direction and change the direction of said light again, from the second direction to the first direction, whereby said light exits the upper surface traveling in said first direction;
a graphical indicator located on the upper surface of the solid body portion such that at least a the graphical indicator is outside the perimeter of the display presentation device and capable of being illuminated by light emitted from the light source inside the first lighting source area.

16. The bezel of claim 15 wherein the bezel is made from a clear material is selected from the group consisting of a polycarbonate and an acrylic.

17. The bezel of claim 15 further comprising an ink, the ink disposed on at least one of: portions of the upper surface of the bezel and portions of the lower surface of the bezel.

18. An instrument panel comprising:
a display presentation device having a substantially planar top surface, a perimeter extending around the top surface, a display inactive area inside the perimeter, and a first lighting source area inside the display inactive area, the display presentation device also having a second display area inside the first lighting source area;
at least one bezel having a top surface a first portion of which is outside the perimeter, the at least one bezel also having a substantially planar bottom surface at least part of which is inside the perimeter, the at least one bezel configured to substantially cover the first lighting source area and leave the second display area uncovered;
a graphical indicator disposed on the top surface of the bezel, at least a portion of the graphical indicator being outside the perimeter;
wherein the display presentation device is configured and arranged to produce and emit light from one or more selected portions of the first lighting source area such that the emitted light from the first lighting source area travels in a first direction and enters the at least one bezel at a location on the bottom surface of the bezel that is inside the perimeter, said light passes through the at least one bezel in a second and different direction to a second location beyond the perimeter and exits the at least one bezel in said first direction at a location on the upper surface that is outside the perimeter, and is thereby effective to illuminate the graphical indicator.

* * * * *